United States Patent [19]

Nakamura

[11] Patent Number: 4,923,388
[45] Date of Patent: May 8, 1990

[54] INJECTION METAL MOLD

[75] Inventor: Hajime Nakamura, Yamanashi, Japan

[73] Assignee: Sankyo Engineering Co., Ltd., Yamanashi, Japan

[21] Appl. No.: 278,854

[22] Filed: Dec. 2, 1988

[30] Foreign Application Priority Data

Jan. 12, 1988 [JP] Japan .................................. 63-3105

[51] Int. Cl.$^5$ ............................................ B29C 45/33
[52] U.S. Cl. ................................. 425/577; 425/450.1; 425/589; 425/DIG. 58
[58] Field of Search ............... 425/577, DIG. 58, 589, 425/450.1, 451.9

[56] References Cited

U.S. PATENT DOCUMENTS 4,515,342 5/1985 Boskovic .............................. 425/577
4,768,747 9/1988 Williams et al. ..................... 425/577
4,792,297 12/1988 Wilson ................................. 425/589

Primary Examiner—Jay H. Woo
Assistant Examiner—Timothy W. Heitbrink
Attorney, Agent, or Firm—Colucci & Umans

[57] ABSTRACT

A injection metal mold wherein a metal mold body having an article forming section therein and a metal mold fixing frame separately formed from the metal mold body, and on which the metal mold body is fixedly mounted and which is to be mounted on a molding machine body is constituted such that a slide mechanism section for a slide core which is moved into or out of the article forming section of the metal mold body in response to opening or closing movement of the metal mold body is provided on the side of the metal mold fixing frame. Further, a forming section of the slide core is formed as a separate member from the slide mechanism section and is removably mounted on the slide mechanism section.

4 Claims, 3 Drawing Sheets

INJECTION METAL MOLD

BACKGROUND OF THE INVENTION

1. Field of the Invention

This invention relates to an injection metal mold for so-called undercut molding wherein molding is effected by pouring of a material such as a synthetic resin material into a metal mold body in which a slide core different from a core of the metal mold body is projected to a lower edge portion of an article to be molded.

2. Description of the Prior Art

Conventionally, a metal mold body having an article forming section for forming an article itself therein is formed separately from an opening and closing mechanism for opening and closing the metal mold body and a molding machine body including an injecting and pouring mechanism for pouring a material such as a synthetic resin material into the article forming section of the metal mold body. Meanwhile, the metal mold body and an outer frame mechanism for mounting the metal mold body on the molding machine body are conventionally formed in an integral relationship with each other.

However, since it is very uneconomical to prepare for each type of articles to be molded a metal mold including a metal mold body having an article forming section therein and an outer frame mechanism, it has been a common practice in recent years to prepare a common outer frame mechanism in the form of a metal mold fixing frame mechanism, and further prepare a metal mold body having an article forming section therein for each of different types of articles to be molded and mount one of the metal mold bodies thus prepared on the common outer frame mechanism in the form of a metal mold fixing frame. In other words, one of metal mold bodies which are prepared for different types of articles to be molded and each has an article forming section therein is arbitrarily mounted or replaced on an outer frame mechanism in the form of a metal mold fixing frame.

However, since undercut molding must be effected while an undercut portion forming slide core other than a core side metal mold element which is a body of an article forming section is projected into a cavity of the core side metal mold element, a slide mechanism section for retracting the undercut portion forming slide core from an article forming recess to permit removal of a molded article in response to movement of the metal mold body when the metal mold body is opened for removal of a molded article must be provided on an outer edge of the molded article forming section of the metal mold body.

Such a slide mechanism section for the undercut portion forming slide core as described just above, however, requires a considerable number of components including an angular pin and a corresponding angular pin hole as well as a slider block for slidably moving the slide core. As the slide mechanism section having such a structure as described above is provided on the metal mold body, it occupies a considerable part of the space of the metal mold body. Consequently, the space which can be actually utilized for formation of a molded article in the metal mold body is limited to 5 to 20 percent of the entire space of the metal mold body. Besides, not only the space for the slide mechanism section is required for one of a core cavity side metal mold element of the metal mold body but also the space compels the other mold element in pair with the waste of the same space naturally.

As a result, the metal mold body is increased in size and also in weight, and accordingly, there is also a problem that the operation of replacing the metal mold body is very cumbersome.

In the meantime, a forming section of the undercut portion forming slide core described above is formed in an integral relationship with the slide mechanism section including the angular pin hole and the slider block, and there is a problem that, in order to make some change for the undercut portion, either the outer frame mechanism must be disassembled taking much time or the entire metal mold unit including the outer frame mechanism must be replaced. Further, since the forming section of the slide core is formed in an integral relationship with the slide mechanism section, even a little error cannot be absorbed by the same, and accordingly, there is a problem also in engagement of the metal mold.

SUMMARY OF THE INVENTION

It is an object of the present invention to provide an injection metal mold wherein the space which can be substantially utilized for formation of a molded article in a metal mold body can be improved considerably and accordingly a larger article can be molded on the metal mold body of the same volume and besides the efficiency in operation of replacement of a metal mold element and so on is improved.

It is another object of the present invention to provide an injection metal mold wherein a slide core for forming an undercut portion can be replaced very easily and troubles in engagement of the slide core can be reduced significantly.

In order to attain the objects, according to the present invention, a slide mechanism section for a slide core which is conventionally provided on the metal mold body side is provided on the metal mold fixing frame (outer frame mechanism) side.

With the injection metal mold of the present invention having such a construction as described just above, the metal mold body which constitutes an article forming section is used only for formation of a molded article while a complicated mechanism for operating the metal mold body is installed on the metal mold fixing frame (outer frame mechanism) side, which is advantageous in working and designing. Further, since the effective space for the article forming section is increased, either a larger article or a greater number of articles than ever can be molded on the injection metal mold.

In order to attain the latter object described hereinabove, according to the present invention, a forming section of a slide core which is to be projected into a cavity of a core side metal mold element of a metal mold body is formed as a separate body from a slide mechanism section, that is, the forming section of the slide core is removably mounted on the slide mechanism section.

As for the problem of engagement, a removably mounting mechanism is employed which includes a fitting portion provided on a forming section of a slide core and a fitting groove provided in the slide mechanism section (it is a matter of course that the relationship of the fitting portion and the fitting groove may be reversed), and a little clearance is provided for the fitting portion so that an error can be absorbed.

With the injection metal mold of the present invention having such a construction as described just above, when it is intended to change the shape of an article to be molded, the metal mold body for the article forming section is removed and then the forming section of the slide core is removed from the slide mechanism section, and then a forming section of a new slide core is mounted instead.

Further, where the removably mounting mechanism including a fitting groove is employed, even if some error such as deformation of a guide pin is caused upon sliding movement, the room provided by the clearance between the fitting portion and the fitting groove will absorb the error, which will assure smooth engagement.

The above and other objects, features and advantages of the present invention will become apparent from the following description and the appended claims, taken in conjunction with the accompanying drawings.

DETAILED DESCRIPTION OF THE PREFERRED EMBODIMENT

Figure 1:
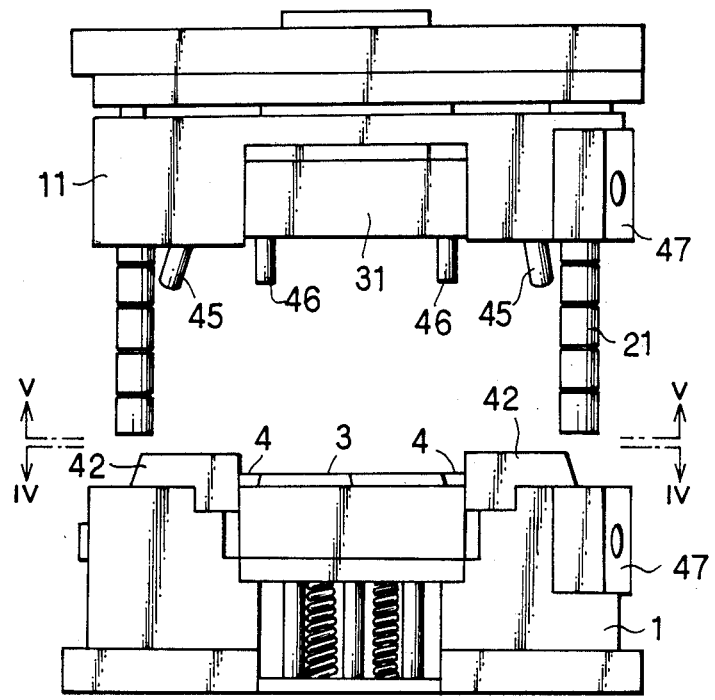
FIG. 1 is a side elevational view of an injection metal mold according to a preferred embodiment of the present invention in a disassembled condition.

An injection metal mold shown in the drawings includes a core side metal mold fixing frame 1 having guide holes 2 formed in portions near major end edges thereof and having a core side metal mold element 3 fixedly mounted at a central portion thereof by means of a fastening member. The core side metal mold element 3 has a convex article forming section therein.

The core side metal mold element 3 has a cavity portion 35 formed at an end edge thereof for fitting with a forming section 4 of a slide core for forming an undercut portion of a molded article. When the core side metal mold element 3 is fitted with a cavity side metal mold element 31, the cavity side metal mold element 31 is communicated with the cavity portion 35, and upon advancement of the forming section 4 of the slide core, the slide core is projected into the cavity portion 35 of the core side metal mold element 3 so that an undercut portion may be formed on a molded article.

A rear end of the forming section 4 of the slide core forms a fitting portion 41 which is inserted sidewardly into and fitted with a little clearance in a fitting groove 43 provided in a slide mechanism section 42 to mount and fit the forming section 4 of the slide core on and with the slide mechanism section 42.

It is to be noted that it is a matter of course that the forming section 4 of the slide core may be mounted on the slide mechanism section 42 by any other means.

The slide mechanism section 42 has an angular hole 44 provided therein and is mounted for sliding movement on the fixing frame 1, and an angular pin 45 provided on a cavity side metal mold fixing frame 11 is inserted into and fitted in the angular hole 44 such that the slide mechanism section 42 may make forward and backward movement in accordance with an installation angle of the pin 45 in response to movement of the fixing frames 1 and 11 toward and away from each other under the guidance of the hole 44. A guide pole 21 is implanted on the cavity side metal mold fixing frame 11 and is inserted into and fitted in the guide hole 2, and the cavity side metal mold element 31 which forms a concave article forming section is fitted at a central portion of the cavity side metal mold fixing frame 11 and is fastened and secured to the latter by means of a fastening member.

Reference numeral 5 denotes an injection nozzle touch, and material injected from a nozzle passes through an injection hole 12 of the cavity side metal mold fixing frame 11 and another injection hole 32 of the cavity side metal mold element 31 and is filled into an article forming cavity 33. After molding of an article, the molded article is taken out by a projecting pin which is projected from a projecting pin hole 34.

It is to be noted that while in the embodiment described hereinabove the slide mechanism section 42 formed as a separate member from the forming section 4 of the slide core is shown provided on the metal mold fixing frame (outer frame mechanism) side, the present invention can be applied to an alternative arrangement wherein the slide mechanism section 42 formed as a separate member from the forming section 4 of the slide core is provided on the metal mold body side.

Since the injection metal mold of the present invention has such a construction as described above, a structural portion of the slide mechanism section which occupies a large area is disposed on the metal mold fixing frame side, and accordingly, up to 41 percent or so of the space of the metal mold body can be used for formation of a molded article. Consequently, there are effects that an article to be molded can be increased in size and that the dead space as in the conventional arrangement can be decreased significantly. Further, the operability is advantageously high in replacement of the metal mold and in positioning and fixation of the metal mold on the fixing frame.

Further, the present invention has effects that replacement of the metal mold including the slide core provided either on the metal mold fixing frame side or on the metal mold body side can be made very easily and that it is possible to use the single metal mold fixing frame commonly for a large number of kinds of metal molds.

In addition, where the fixing groove is employed, there is an effect that an error in engagement is absorbed by the clearance so that troubles in engagement of the slide core can be decreased significantly.

Figure 2:
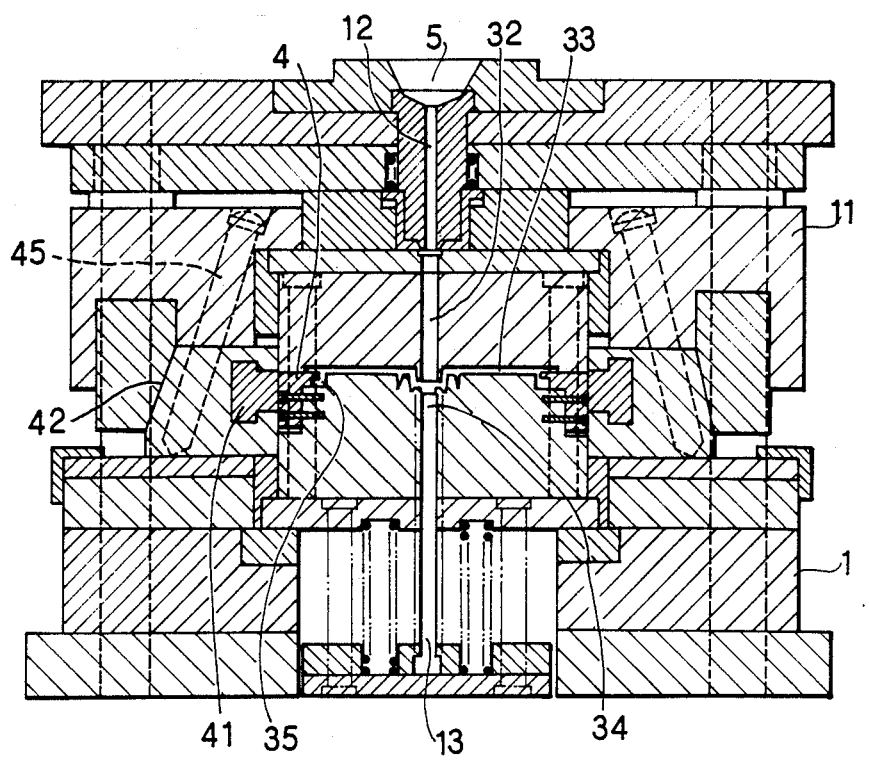
FIG. 2 is a vertical sectional side elevational view of the injection metal mold of FIG. 1 in an assembled condition in which a core side metal mold element and a cavity side metal mold element are engaged with each other to define an article forming gap therebetween.
Figure 3:
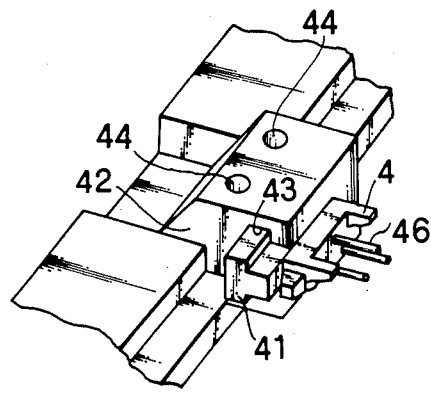
FIG. 3 is an enlarged partial sectional view showing a forming section of a slide core fitted in a slide mechanism section of the injection metal mold of FIG. 1.
Figure 4:
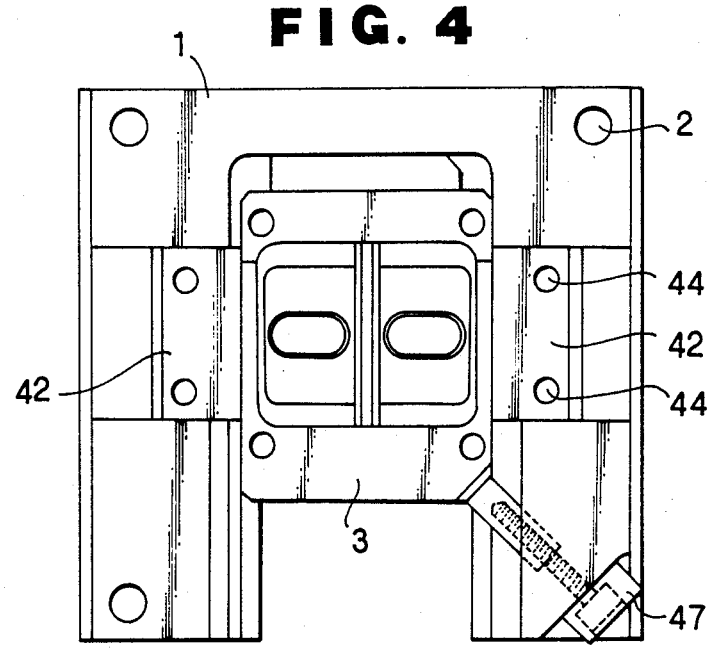
FIG. 4 is a plan view taken along line IV—IV of FIG. 1 showing the core side metal mold element mounted on an outer frame of the injection metal mold.
Figure 5:
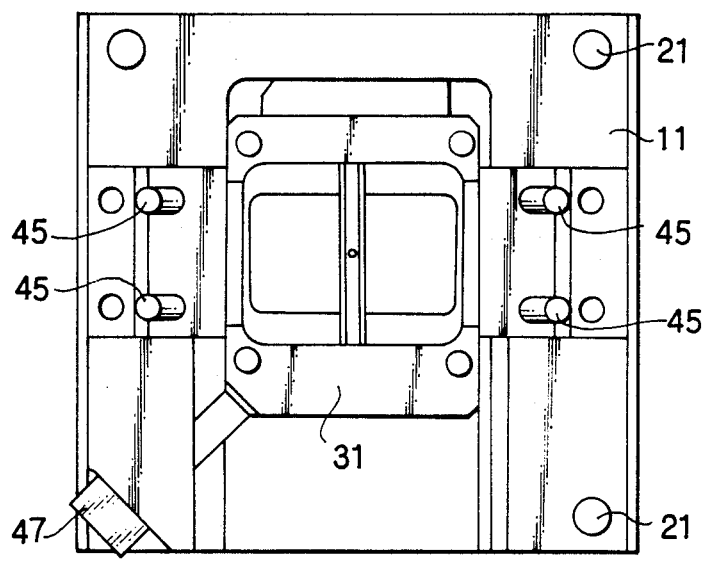
FIG. 5 is a plan view taken along line V—V of FIG. 1 showing the cavity side metal mold element on the outer frame.

As shown in the figures, the cavity side metal mold element or body 31 carries pins 46 which extend in the direction of movement of the frame 11 and engage into holes provided in the core side metal mold element or body 3 (see FIGS. 4 and 5). In likewise fashion, the fixing portion 41 includes pins 46 which extend into holes provided at the sides of core side metal mold element or body 3 as shown for example in FIG. 2. In this way the mold bodies 3 and 31 as well as the undercut forming sections 4 are all correctly aligned with each other when the mold is closed as shown in FIG. 2.

What is claimed is:

1. An injection metal mold comprising:
   a core metal mold fixing frame (1);
   a core metal mold element (3) detachably fixed to said core metal mold fixing frame;
   a cavity metal mold fixing frame (11) mounted for movement toward and away from said core metal mold fixing frame;
   a cavity metal mold element (31) detachably fixed to said cavity metal mold fixing frame and engageable with said core metal mold element to define a cavity (33) having an undercut space (35) near an edge of said cavity;
   injection means connected to either said cavity metal modifying frame or said core metal mold fixing frame for injecting material to be molded into said cavity;
   a slide section (42) having a front surface facing said core metal mold element, said slide section being slidably mounted to said core metal mold fixing frame for movement toward and away from said core metal mold element, said slide section including a fitting groove (43) extending transversely to the direction of sliding movement of said slide section;
   an undercut forming section (4) detachably connected to said slide section at said front surface thereof, said undercut forming section having a portion for insertion into said undercut space when said slide section slides toward said core metal mold element, said undercut forming section having a fitting portion (41) for loosely fitting in said fitting groove, said fitting portion including engagement pins for engaging with bores in said core metal mold element for fixing a relative position between said undercut forming section and said core metal mold element (3);
   slide moving means connected to said cavity metal mold fixing frame and including an inclined portion (45) engageable with said slide section (42) when said cavity and core metal mold fixing frames are moved toward each other, for sliding said slide section toward said core metal mold element (3);
   said cavity and core metal mold elements (3,31) and said undercut forming section (4) comprising an interengageable mold cassette for forming said cavity.

2. An injection metal mold according to claim 1 wherein said slide moving means comprises a plurality of inclined pins extending from said cavity metal mold fitting frame toward said core metal mold fitting frame, said slide section including a plurality of inclined openings therein for closely receiving said inclined pins.

3. An injection metal mold according to claim 2 wherein said cavity metal mold element includes at least one pin extending in the direction of relative movement between said fixing frames, said core metal mold element including a bore for receiving said pin of said cavity metal mold element.

4. An injection metal mold according to claim 3 including a second slide section positioned on the side of said core metal mold element which is opposite from said first mentioned slide section.

* * * * *